US006471113B1

(12) United States Patent
Hirayama et al.

(10) Patent No.: US 6,471,113 B1
(45) Date of Patent: Oct. 29, 2002

(54) METHOD OF FORMING A COATING ON MACHINE COMPONENTS

(75) Inventors: Seizo Hirayama; Manabu Sugiura; Kazuaki Iwama, all of Kariya; Seiji Suzaki, Ohbu, all of (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/806,004

(22) PCT Filed: Jul. 25, 2000

(86) PCT No.: PCT/JP00/04936

§ 371 (c)(1),
(2), (4) Date: Jun. 13, 2001

(87) PCT Pub. No.: WO01/07786

PCT Pub. Date: Feb. 1, 2001

(30) Foreign Application Priority Data

Jul. 27, 1999 (JP) .......................................... 11-212670

(51) Int. Cl.$^{7}$ ............................................... B23K 20/12

(52) U.S. Cl. .................................... 228/115; 228/114.5

(58) Field of Search ................................ 228/115, 114, 228/114.5, 112.1; 74/60; 92/71; 156/73.5; 417/53

(56) References Cited

U.S. PATENT DOCUMENTS 3,824,663 A * 7/1974 Sohn et al.
4,263,814 A * 4/1981 Takaoka et al.
4,641,570 A * 2/1987 Futamura et al.
5,056,417 A 10/1991 Kato et al. ...................... 92/71
5,655,432 A * 8/1997 Wilkosz et al.
5,858,142 A * 1/1999 Tully et al.
5,897,047 A * 4/1999 Takei et al.
6,123,009 A * 9/2000 Kanayama et al.
6,189,434 B1 * 2/2001 Kawaguchi et al
6,192,784 B1 * 2/2001 Kato et al.

FOREIGN PATENT DOCUMENTS

EP 0 911 517 A2 4/1999 ........... F04B/27/08
GB 0474455 * 3/1992
JP 7-40700 9/1995 ........... F04B/27/08
JP 2000-265284 9/2000 ........... C23C/26/00

* cited by examiner

*Primary Examiner*—Tom Dunn
*Assistant Examiner*—Jonathan Johnson
(74) *Attorney, Agent, or Firm*—Morgan & Finnegan, LLP

(57) ABSTRACT

A method of forming a coating on a work surface of a machine component. The method includes a preparatory step of preparing a feed form formed of a metal material that is softer than at least a work surface of a machine component, a pressure-welding step of pressure-welding an end face of the feed form to the work surface of the machine component while causing relative rotation between the machine component and the feed form, to join the feed form to the machine component, and a cutting step of cutting the feed form in a direction substantially orthogonal to an axis of the relative rotation at a portion near a joining position at which the machine component and the feed form are joined, to add a soft metal layer having a predetermined thickness to the work surface of the machine component.

14 Claims, 4 Drawing Sheets

METHOD OF FORMING A COATING ON MACHINE COMPONENTS

BACKGROUND OF THE INVENTION

This invention relates to a method of forming a coating on a work surface of a machine component. The coating is of a metal material that is softer than the work surface of the machine component, and more particularly, to a method of forming a coating on a surface of a swash plate for use in a swash plate compressor to improve sliding contact between the surface of the swash plate and shoes.

Within a swash plate compressor, lubrication between sliding contact members that form an internal mechanism is generally provided by forming a mist of a lubricating oil in the compressor by using a gas (e.g. a refrigerant gas such as chlorofluorocarbon gas) flowing in the compressor, in accordance with operation of the compressor, and delivering the oil in the form of mist to the respective sliding contact members. However, at a restart of the compressor, for instance, after it has been left in an inoperative state for a long time, lubricating oil attached to the sliding contact members has often been washed away by the refrigerant gas. For this reason, immediately after the restart of the compressor, the sliding contact members, which need lubrication, are insufficiently oiled, in spite of operation of the compressor, over a time period (approximately one minute) until a sufficient mist of oil is formed by refrigerant gas that returns to the compressor. Therefore, conventionally, there have been proposed techniques of coating the surfaces of the sliding contact members to ensure minimum lubrication between the sliding contact members even when they are insufficiently oiled during the above-mentioned time period.

Conventionally, various techniques have been proposed, even in a limited field of art, in which a coating is formed on surfaces of a swash plate, more specifically, surfaces of a swash plate in sliding contact with shoes. Coating techniques not only disclosed in patent documents but also employed on products (swash plate) include electrolytic and electroless plating techniques using tin or the like and a spray coating technique using a copper-based alloy, an aluminum-based alloy, or the like.

In the electrolytic or electroless plating technique using tin, however, an extremely thin coating having a thickness of several micrometers (e.g. 1 to 10 $\mu$m) can be formed without much difficulty, whereas a relatively thick coating having a thickness of several tens of micrometers (e.g. 20 to 70 $\mu$m) cannot always be formed with ease. Further, in this plating technique, the electrochemical relationship between the base material and the metal to be deposited matters and can present problems. Thus, the technique cannot always be employed.

On the other hand, a spray coating technique, in which metal material in powder form is melted and sprayed together with flame onto a work surface does not encounter significant difficulties with regard to coating thickness or electrochemical relationship. However, the technique suffers from the following intrinsic problems in operations: In many cases, it is required to roughen the surface of a work surface of a machine component by shot blasting or the like before providing spray coating. Time and labor required for the pretreatment and a cost for hard particles (auxiliary material) used in the surface roughening treatment are factors increasing the time and cost for the spray coating. Further, considerable noise is generated during the surface roughening treatment, which degrades the working environment. Moreover, before providing spray coating, it is required to mask portions that do not need spraying, which further increases the time and cost. As described above, in spite of its high general versatility as a technique for forming a metal coating on a metal work surface, the spray coating technique has many problems to be solved with respect to the working environment on the shop floor as well as the labor, time and cost.

It is an object of the present invention to provide a method of forming a coating that is versatile, improves the working environment, and reduces the required labor, time and cost. Further, it is another object to provide a method of forming a coating that facilitates control of thickness of the coating.

SUMMARY OF THE INVENTION

The gist of the present invention consists in a method of forming a coating on a work surface of a machine component including a preparatory step of preparing a feed form made of a metal material softer than at least a work surface of the machine component, a pressure-welding step of pressure-welding an end face of the feed form to the work surface of the machine component while causing relative rotation between the machine component and the feed form, to thereby join the feed form to the machine component, and a cutting step of cutting the feed form in a direction substantially orthogonal to an axis of the relative rotation at a position near a joining position at which the machine component and the feed form are joined to each other, to thereby add a soft metal layer having a predetermined thickness to the work surface of the machine component.

According to this method, a soft metal layer having a predetermined thickness is formed on the work surface of the machine component by joining the machine component and the feed form to each other by friction welding, and subsequently cutting the feed form. Therefore, by selecting a cutting position for cutting the feed form as desired, it is possible to control the thickness of a metal coating on lit the work surface with ease. Further, it is possible to form a metal material coating having a desired thickness on the work surface of the machine component with ease at low cost.

Preferably, the method further comprises a surface-finishing step of carrying out surface finishing of the soft metal layer added to the work surface of the machine component. By providing the surface-finishing step after the cutting step, it is possible not only to improve the smoothness of the surface of the soft metal layer, but also to widen a range of selection in determining the cutting position for cutting the feed form, thereby facilitating the operation for cutting the feed form.

Preferably, the metal material forming the feed form has a lower melting point than the material forming the machine component. Also preferably, the material forming the machine component is a ferrous material while the metal material forming the feed form is an aluminum-based material or a copper-based material.

For example, the machine component is a swash plate for use in a swash plate compressor. The method of the present invention is an extremely suitable method of forming a coating on a surface of the swash plate. Preferably, the work surface of the swash plate machine component is a surface that makes sliding contact with a shoe.

The method may further include forming a solid lubricant coating containing a solid lubricant, such as molybdenum sulfide, on a surface of the soft metal layer added to the work surface of the machine component.

DETAILED DESCRIPTION OF THE PROFFERED EMBODIMENT

Figure 1:
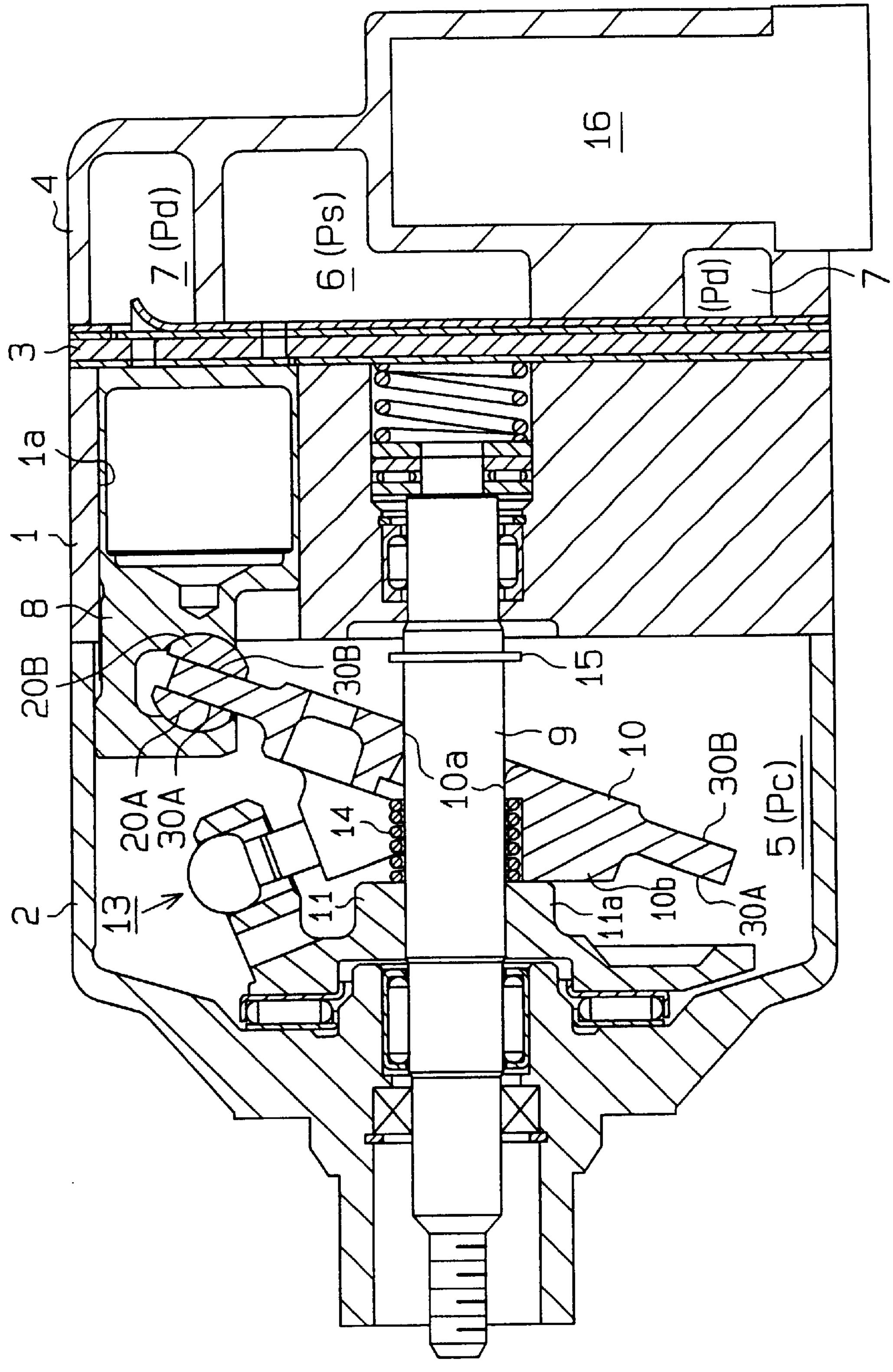
FIG. 1 is a longitudinal cross-sectional view of a variable capacity swash plate compressor.

First, a brief description will be made of an example of a variable capacity swash plate compressor to which the present invention is applied. As shown in FIG. 1, the swash plate compressor is comprised of a cylinder block 1, a front housing 2 joined to the front end of the cylinder block 1, and a rear housing 4 joined to the rear end of the cylinder block 1 via a valve plate 3. These components are secured to each other by a plurality of bolts, not shown, to form a housing of the compressor. Within the housing, there are defined a crankcase 5, a suction chamber 6, and a discharge chamber 7. The cylinder block 1 is formed with a plurality of cylinder bores la (only one of which is shown), and each cylinder bore la has a single-headed piston 8 housed therein such that the piston 8 reciprocates. The suction chamber 6 and the discharge chamber 7 can selectively communicate with the respective cylinder bores 1*a* via various flap valves formed in the valve plate 3.

Within the crankcase 5, a drive shaft 9 is rotatably supported, and a swash plate is accommodated. The swash plate 10 has a central through hole 10*a*, and the drive shaft 9 extends through the through hole 10*a*. The swash plate 10 is connected to the drive shaft 9 via a hinge mechanism 13 and a lug plate 11, such that the swash plate 10 rotates integrally with the drive shaft 9. The swash plate 10 rotates in unison with the drive shaft 9 and, at the same time, may incline with respect to the drive shaft 9 while sliding in the axial direction. Further, the outer periphery of the swash plate 10 is connected to an end of each piston 8 via a pair of front and rear shoes 20A, 20B, and all the pistons 8 are driven by the swash plate 10.

As the swash plate 10, which is inclined by a predetermined angle, rotates in unison with the drive shaft 9, each piston 8 is caused to reciprocate by a stroke that corresponds to the inclination angle of the swash plate 10.

In each bore 1*a*, suction of refrigerant gas from the suction chamber 6 (region of suction pressure Ps), compression of the refrigerant gas, and delivery of the refrigerant gas to the discharge chamber 7 (region of discharge pressure Pd) are sequentially and repeatedly carried out.

The swash plate 10 is urged by an inclination-decreasing spring 14 toward the cylinder block (i.e. in an inclination-decreasing direction). However, the inclining and sliding motion of the swash plate 10 in the inclination-decreasing direction is restricted by, for example, a circlip 15, which is fitted on the drive shaft 9, whereby the minimum inclination angle θmin (e.g., within a range of 3 to 5 degrees) of the swash plate 10 is set. On the other hand, the maximum inclination angle θmax of the swash plate 10 is limited, e.g., by abutment of a counter-weight portion 10*b* of the swash plate on a stopper portion 11*a* of the lug plate 11. The inclination angle of the swash plate 10 is determined based on a mutual balance among various moments, such as a turning moment based on centrifugal force produced by rotation of the swash plate, a moment based on a resilient force produced by the inclination-decreasing spring 14, a moment based on the inertial force of reciprocating motion of each piston, and a moment based on gas pressure.

The moment based on gas pressure is produced based on the relationship between the internal pressure within the cylinder bores and the internal pressure within the crankcase (crank pressure Pc), which corresponds to the back pressure of the corresponding piston. The moment acts in the inclination-decreasing direction or in the inclination-increasing direction depending on the crank pressure Pc. In the swash plate compressor shown in FIG. 1, it is possible to change the moment produced by the gas pressure as desired by adjusting the crank pressure Pc with a control valve 16, not shown, to set the inclination angle of the swash plate 10 to a desired angle θ between the minimum inclination angle θmin and the maximum inclination angle θmax.

Figure 2:
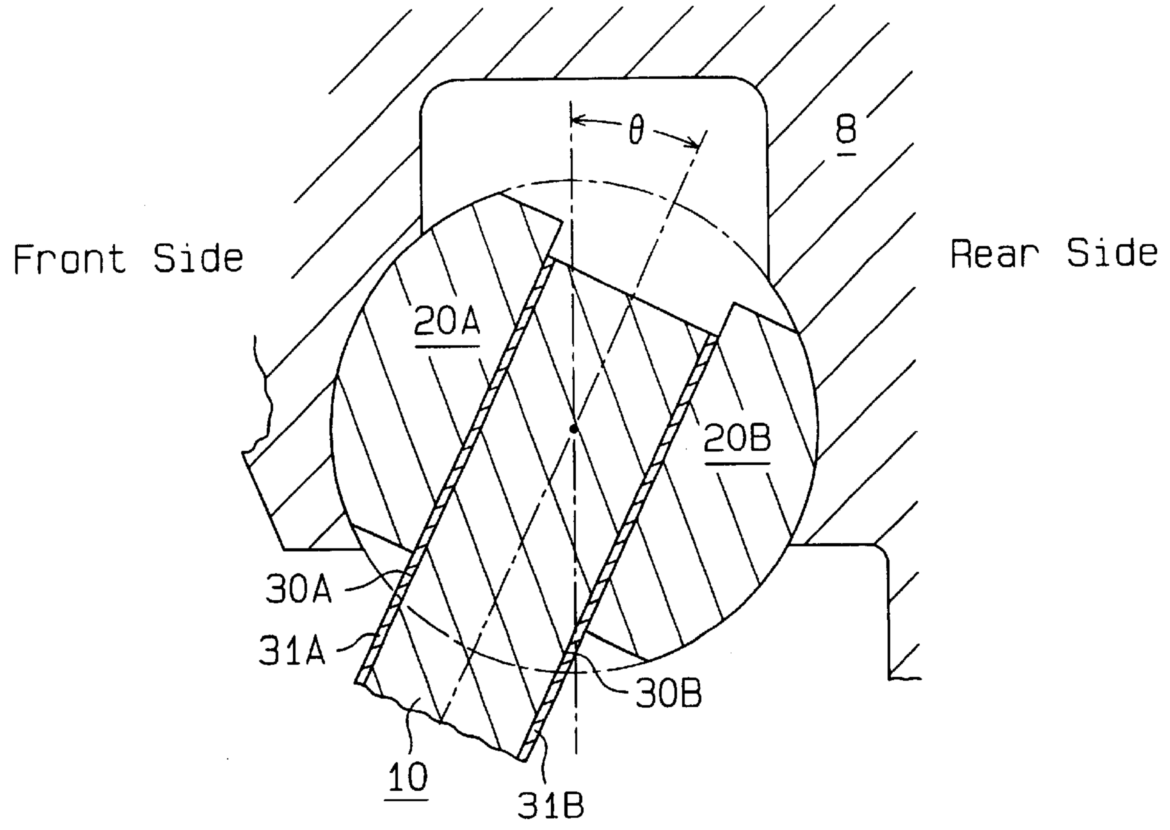
FIG. 2 is a sectional view showing an outer peripheral portion of the swash plate in contact with shoes, on an enlarged scale.
Figure 3:
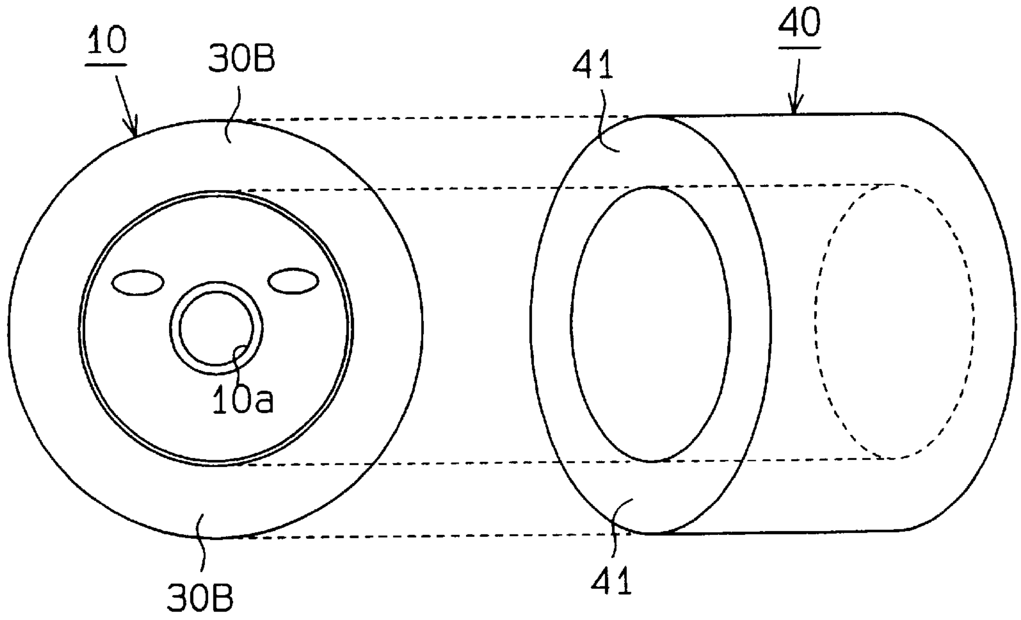
FIG. 3 is a diagram including a front view of a rear surface of the swash plate and a perspective view of a feed form.

In the compressor constructed as above, one of the machine components to be coated is the swash plate 10. As shown in FIGS. 1 to 3, the swash plate 10 has annular sliding contact surfaces 30A, 30B formed on the respective front and rear sides of the outer periphery thereof. The annular front and rear sliding contact surfaces 30A, 30B are in sliding contact with the pair of shoes 20A, 20B respectively. The swash plate 10 is made of a relatively heavy ferrous material (e.g., a cast iron such as FCD700) to properly generate the turning moment based on the centrifugal force produced by rotation of the swash plate 10. The shoes 20A, 20B are also made of a ferrous material (e.g. bearing steel) in view of mechanical strength. If the two components (the swash plate and the shoe in the present embodiment) are formed of materials of the same kind and are brought into sliding contact with each other under severe conditions, seizure of the components occurs due to so-called “same metal phenomenon.” Therefore, in the present embodiment, coatings 31A, 31B are formed at least on the respective sliding contact surfaces 30A, 30B of the swash plate 10 to form sliding layers for improving sliding contact between the sliding contact surfaces 30A, 30B and the shoes. That is, in the present embodiment, the sliding contact surfaces 30A, 30B of the swash plate 10 each form a work surface.

The coatings 31A, 31B are each made of a different kind of metal material from the ferrous material used as a base material of the swash plate 10 and from that forming the shoes 20A, 20B. The metal material forming the coatings 31A, 31B may be an aluminum alloy containing silicon or an intermetallic compound of aluminum and silicon (hereinafter both referred to as “the Al—Si metal material”), or a copper-based material. In the case of the Al—Si metal material as the aluminum-based material, physical properties thereof, such as hardness and a melting point, vary with its silicon content. The Al—Si metal material used here has a silicon content of 15 to 20 wt %. By forming the coatings 31A, 31B with the Al—Si metal material, it is possible not only to prevent seizure due to the aforementioned same metal phenomenon but also to improve sliding contact between the swash plate 10 and the shoes 20A, 20B. That is, the coatings 31A, 31B so formed make it possible to ensure a certain degree of lubrication between the swash plate 10 and the shoes 20A, 20B even under oil-free circumstances.

In this connection, the ferrous materials forming the swash plate 10 and the shoes 20A, 20B are very hard and each have a relatively high melting point, above one thousand and several hundred ° C. (e.g. above approximately 1500° C.), whereas the Al—Si metal material forming the coatings 31A, 31B is softer than the ferrous materials and has a melting point of approximately 600° C. to 700° C., which is lower than those of the ferrous materials. No doubt, the differences in physical properties between the Al—Si metal material and the ferrous materials contribute to improving of the sliding contact between the swash plate 10 and the shoes 20A, 20B. Further, the differences in physical properties are very important in the determination of use of a method of forming a coating, described hereafter.

Next, detailed description will be made of a procedure for forming the coating 31B on the rear sliding contact surface (work surface) 30B of the swash plate machine component 10. The coating 31A is similarly formed on the front sliding contact surface 30A by following the steps described below.

In a first step (preparatory step), a feed form 40, as shown in FIG. 3, is prepared. The feed form 40 is formed entirely of the Al—Si metal material and has a hollow cylindrical shape and a thick wall. One end face 41 of the feed form 40 is an annular end face corresponding to the annular sliding contact surface 30B (or 30A) of the swash plate 10. Therefore, when the end face 41 of the feed form 40 is joined to the sliding contact surface 30B of the swash plate 10, the end face 41 covers the whole sliding contact surface 30B.

Figure 4:
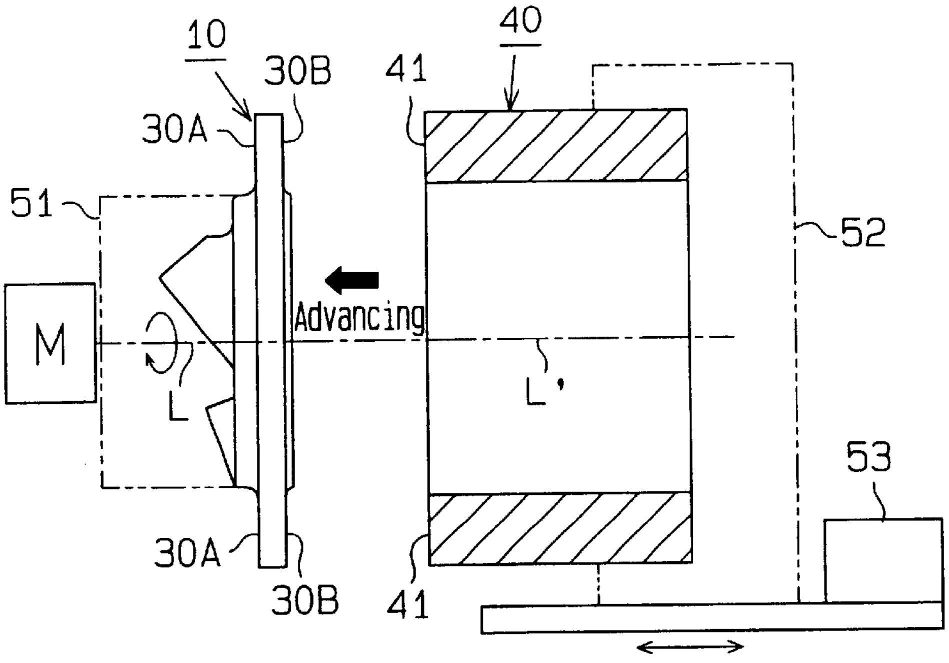
FIG. 4 is a side view diagramatically showing a pressure-welding device.

In a second step (pressure-welding step), as shown in FIG. 4, the swash plate 10 is fitted on a rotary holding mechanism 51 (conceptually shown by two-dot-chain lines), while the feed form 40 is fitted in a sliding and holding mechanism 52 (conceptually shown by two-dot-chain lines). The rotary holding mechanism 51 is connected to a motor M such that it rotates integrally with the motor M, to rotate the swash plate 10 about an axis L by torque from the motor M. When the swash plate is fitted on the rotary holding mechanism 51, the annular sliding contact surface 30B is on a plane orthogonal to the axis L and opposed to the end face 41 of the feed form and spaced from the feed form. On the other hand, the sliding and holding mechanism 52 is connected to a sliding device 53 such that it moved integrally with the sliding device 53. The sliding and holding mechanism 52 is operated to bring the feed form 40 into contact with the swash plate 10, to press the feed form 40 against the swash plate 10, and to move the feed form 40 away from the swash plate 10. When the feed form 40 is held in the sliding mechanism 52, an axis L' of the feed form 40 and the axis L of the swash plate 10 coincide with each other, and when the feed form 40 is moved forward to the swash plate 10, the end face 41 is brought into face-to-face contact with the sliding contact surface 30B of the swash plate.

Figure 7:
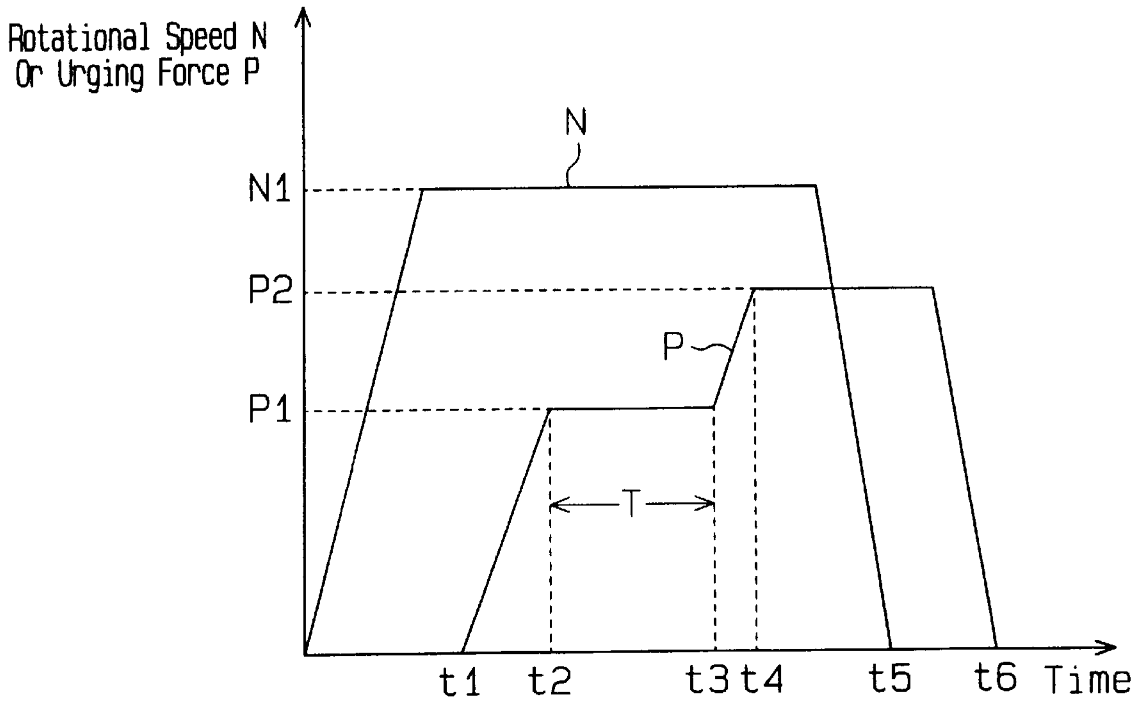
FIG. 7 is a graph showing changes in a rotational speed and urging force with respect to time in the step of pressure welding.

After the swash plate 10 and the feed form 40 have been fixed in the respective mechanisms 51, 52, the motor M and the rotary holding mechanism 51 are operated to rotate the swash plate 10 at a predetermined rotational speed N1 (e.g., at a rotational speed equal to or higher than 1800 rpm) as shown in FIG. 7. More specifically, a relative difference in speed in a circumferential direction is produced between the feed form 40, which is stationary, and the swash plate 10 to cause relative rotation about the common axis L and L' between the feed form 40 and the swash plate 10. Then, while maintaining the rotation of the swash plate 10, the sliding device 53 is operated to move the feed form 40 toward the swash plate 10 together with the sliding holding mechanism 52 until the end face 41 is brought into contact with the sliding contact surface 30B.

Even after time t1 in FIG. 7 when the feed form 40 has been brought into contact with the swash plate 10, the feed form 40 is urged in an advancing direction, and a force P of the feed form 40 against the swash plate 10 is increased to an intermediate force P1. Then, the intermediate pressure P1 is held over a predetermined time period T (T=t3−t2). By causing the swash plate 10 and the feed form 40 to perform relative rotation over the predetermined time period T while maintaining the intermediate force P1, the Al–Si metal material of the feed form 40 is melted to conform to the ferrous material of the swash plate 10. As a result, a diffusion layer formed by mutual diffusion of elements of constituents of the material of the swash plate 10 and the material of the feed form 40 is formed in the contact area (or interface) between the swash plate 10 and the feed form 40.

Figure 5:
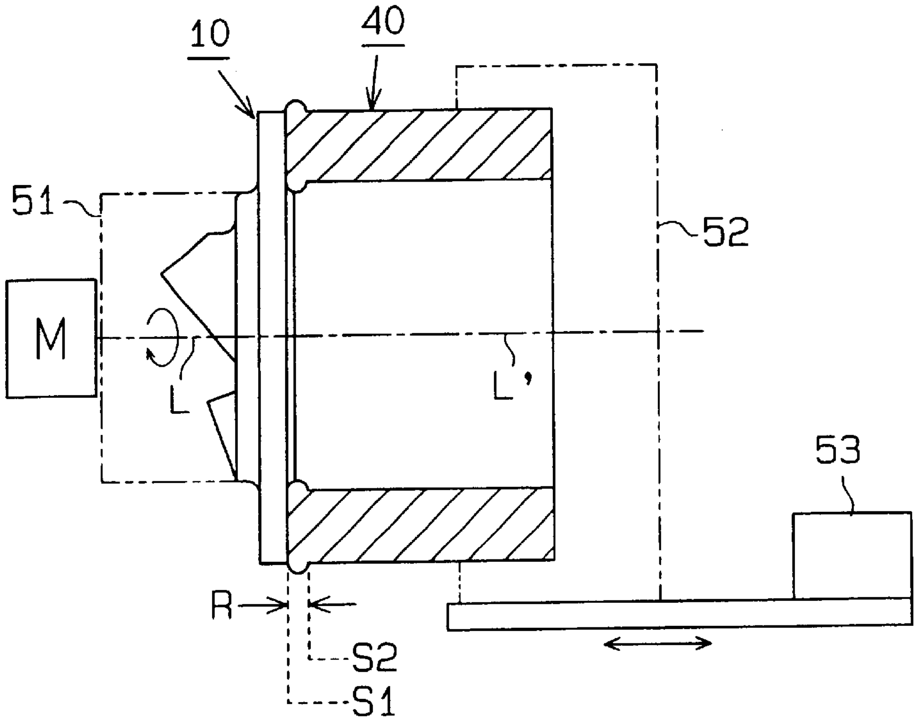
FIG. 5 is a side view of the pressure-welding device of FIG. 4 in a step of pressure welding.

After the predetermined time period T, the feed form 40 is further urged in the advancing direction and the force P of the feed form 40 against the swash plate 10 is increased to a final force P2 (time t4). At this time, as shown in FIG. 5, the cylindrical end portion of the feed form 40 undergoes plastic deformation such that it expands radially outward and inward, and at the same time, the feed form 40 is reliably joined to the swash plate 10. When the force P has reached the final force P2, the rotation of the swash plate 10 and the feed form 40 is stopped (time t5), and then, the force P is removed (time t6). Then, after the lapse of a predetermined cooling time period or without any particular cooling time period, the processing proceeds to a third step.

Figure 6A:
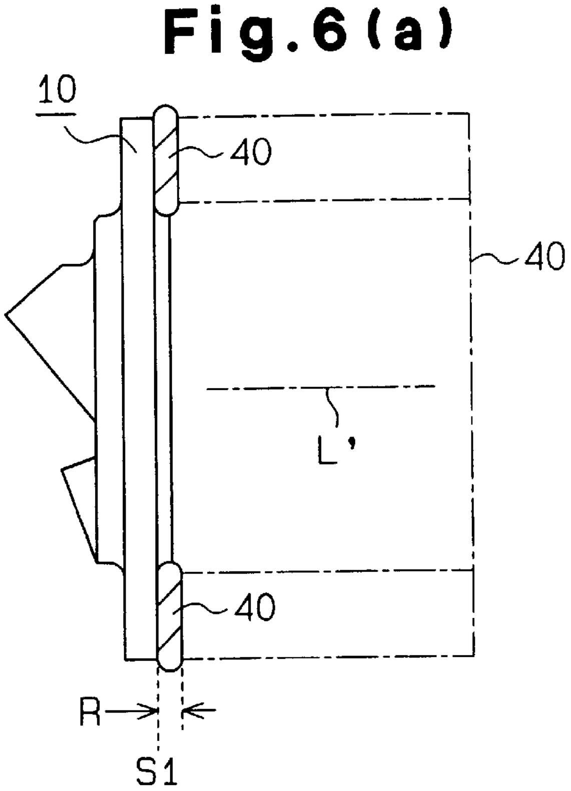
FIG. 6(*a*) is a side view of the swash plate immediately after cutting of the feed form, while FIG. 6(*b*) is a side view of the swash plate after completion of surface finishing a pre-coating.
Figure 6B:
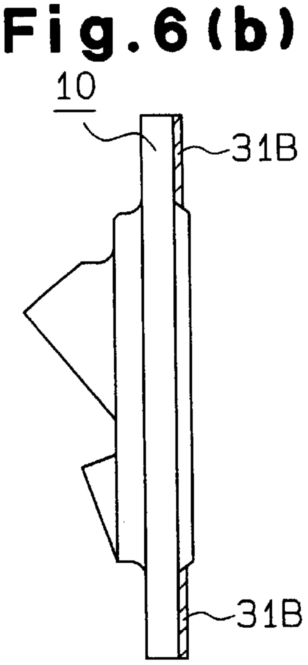

In the third step (cutting step), the feed form 40 is cut from the swash plate 10. The operation for cutting off the feed form 40 is carried out at a cutting position S2, which is offset toward the fee form 40 from a joint position SI by a predetermined distance R. A cutting tool, not shown, such as a turning tool for use in a machining or a cutter device, not shown, is used for cutting. The feed form 40 is cut at the cutting position S2 in a direction orthogonal to the axis L'. In other words, the feed form 40 is cut and separated into a front portion and a rear portion along a plane orthogonal to the axis L' (see FIG. 6(*a*)). The distance R between the joint position S1 and the cutting position S2 corresponds to a length obtained by adding together the required thickness of the coating 31B and the thickness of a portion to be cut away in surface finishing, which is described below. Preferably, the distance (or the thickness) R is within a range of 200 to 400 μm (micrometers).

In a fourth step (surface-finishing step), surface finishing is performed on a preliminary coating (a soft metal layer made of the Al—Si metal material and having the thickness of R) formed on the sliding contact surface 30B of the swash plate 10. For the surface finishing, lathe machining by a tool, such as a triangular tip, and polishing can be employed. By carrying out the surface finishing, a rough surface of the preliminary coating is removed, and the coating 31B is finished to have a desired thickness (e.g., 10 to 150 μm, and more preferably, 50 to 100 μm) and a smooth surface (see FIG. 6(B)). The third and fourth steps may be carried out at another worksite by removing the swash plate 10 from the rotary holding mechanism 51.

According to the present embodiment, it is possible to achieve the following effects:

The method of forming a coating according to this embodiment makes it possible to form the coatings 31A, 31B made of the Al—Si metal material on the respective sliding contact surfaces 30A, 30B of the swash plate 10 efficiently in a relatively short time by following a simple procedure.

Differently from the conventional spray coating technique, the present method does not require any special pretreatment to be effected on the work surfaces of the swash plate 10. Further, since the shape of each work surface and that of the end face of the feed form 40 are made correspondent to each other, no special masking or the like is required, either. Therefore, it is possible to largely reduce the labor, time and cost required for the operations.

Since no especially large noise is produced during the operation for the pressure welding of the feed form 40 to the swash plate 10, there is no fear of degrading the working environment due to noise or the like.

The present method is a versatile coating-forming technique because the coating 31A or 31B is applied or added to the work surface basically by making a physical joint by pressure welding, which requires no close chemical affinity.

In the present method, the feed form 40 is cut into the front and rear portions at the cutting position S2 after the feed form 40 is pressure-welded to the swash plate 10, and the preliminary coating is added to the work surface of the swash plate 10. Accordingly, it is possible to set the thickness R of the preliminary coating to a dimension that includes the final thickness of the coating 31A or 31B and that of the portion to be removed by surface finishing, which makes it easy to adjust the coating thickness as desired while ensuring the smoothness of the surface of the coating 31A or 31B.

The embodiment of the present invention may be modified as follows:

Although in the above embodiment, the swash plate 10 is rotated while the feed form 40 is displaced, this is not limitative. The feed form 40 may be rotated, and the swash plate 10 may be displaced. Alternatively, the swash plate 10 and the feed form 40 may be rotated at different rotational speeds, respectively, such that a relative difference in rotational speed is produced between the swash plate 10 and the feed form 40, and pressed against each other.

The portions or sites to which the method of the present invention can be applied are not limited to the sliding contact surfaces 30A, 30B of the swash plate 10. Al—Si metal coatings may be similarly formed on the plane surfaces of the shoes 20A, 20B, which contact the respective sliding contact surfaces of the swash plate.

Further, after a soft metal layer with a predetermined thickness is formed on each work surface, a solid lubricant coating containing a solid lubricant, such as molybdenum sulfide or the like, may be formed on the soft metal layer.

INDUSTRIAL APPLICABILITY

As described above in detail, the method according to the present invention is a very versatile technique of forming a coating for a metal material on a work surface of a machine component. Further, the method makes it possible to preserve an excellent working environment and at the same time effectively reduce the labor, time, and cost required for the operations. Moreover, the present invention facilitates control of the thickness of a coating.

What is claimed is:

1. A method of forming a coating on a machine component, the machine component having a surface area made of metal, the method comprising:

pressing an end face of a feed form against the surface area while producing relative rotation between the machine component and the feed form to join the feed form to the surface area of the machine component, wherein the feed form is made of a metal material that is softer than that of the predetermined surface area; and cutting the feed form in a direction transverse to the axis of the relative rotation such that a layer of material from the feed form remains on the surface area.

2. The method of claim 1 further comprising finishing the surface of the layer.

3. The method claim of claim 1 further comprising forming a coating of solid lubricant on a surface of the layer.

4. The method of claim 1 wherein the melting point of the material forming the feed form has a melting point that is lower than that of the surface area.

5. The method of claim 1, wherein the material forming the machine component is a ferrous material and the metal forming the feed form is an aluminum or copper based material.

6. The method of claim 1 wherein the machine component is a swash plate of a compressor, wherein the swash plate has an axis of rotation, and the method includes holding the swash plate such that the axis of rotation of the swash plate coincides with an axis of the feed form.

7. The method according to claim 1, wherein the step of pressing an end face of a feed form includes pressing an annular end face of the feed form against an annular surface area of the machine component, wherein an axis of the annular end face coincides with an axis of the feed form.

8. A method of forming a coating on a machine component, the machine component having a surface area made of metal, the method comprising:

pressure welding an end face of a feed form against the surface area while producing relative rotation between the machine component and the feed form to join the feed form to the surface area of the machine component, wherein the feed form is made of a metal material that is softer than that of the predetermined surface area; and machining the feed form such that a layer of material from the feed form remains on the surface area.

9. The method of claim 8 further comprising finishing the surface of the layer.

10. The method claim of claim 8 further comprising forming a coating of solid lubricant on a surface of the layer.

11. The method of claim 8 wherein the melting point of the material forming the feed form is lower than that of the surface area.

12. The method of claim 8, wherein the material forming the machine component is a ferrous material and the metal forming the feed form is an aluminum or copper based material.

13. The method of claim 8 wherein the machine component is a swash plate of a compressor, wherein the swash plate has an axis of rotation, and the method includes holding the swash plate such that the axis of rotation of the swash plate coincides with an axis of the feed form.

14. The method according to claim 8, wherein the step of pressing an end face of a feed form includes pressing an annular end face of the feed form against an annular surface area of the machine component, wherein an axis of the annular end face coincides with an axis of the feed form.

* * * * *

UNITED STATES PATENT AND TRADEMARK OFFICE

CERTIFICATE OF CORRECTION

PATENT NO. : 6,471,113 B1
DATED : October 29, 2002
INVENTOR(S) : Hirayama et al.

It is certified that error appears in the above-identified patent and that said Letters Patent is hereby corrected as shown below:

Column 2,
Line 39, please delete "coating on lit the" and insert therefore -- coating on the --;

Column 3,
Line 44, please delete "plate is accommodated" and insert therefore -- plate 10 is accommodated --;
Line 59, please delete hard return after "plate 10." so that the line "In each bore…" follows as a sentence immediately after, not as a new paragraph.

Column 6,
Line 37, please delete "joint position SI" and insert therefore -- joint position S1 --;

Column 8,
Line 56, please delete "claim 8 wherein" and insert therefore -- claim 8, wherein --.

Signed and Sealed this

First Day of April, 2003

JAMES E. ROGAN
*Director of the United States Patent and Trademark Office*